Patented Aug. 12, 1952

2,606,883

UNITED STATES PATENT OFFICE 2,606,883

RESINOUS MATERIALS

Fred W. Hoover, Wilmington, Del., assignor to E. I. du Pont de Nemours & Company, Wilmington, Del., a corporation of Delaware No Drawing. Application October 20, 1949, Serial No. 122,583

9 Claims. (Cl. 260—22)

This invention relates to new compositions of matter, and more particularly to air-drying coating compositions.

Air-drying polyesters of the types described in the prior art possess certain characteristics which make them useful in various applications such as coating compositions. However, the hitherto known polyesters are deficient in other desired properties, and particularly in their tendency to become embrittled on aging and to develop undesirable color on aging. Hence, there exists a need for new air-drying resinous materials having improved properties.

This invention has as an object a new and useful type of resinous film-forming material. A further object is a new air-drying polyester which forms valuable high quality coating compositions yielding films resistant upon aging to embrittlement and to development of undesirable color. Further objects reside in methods for obtaining these new resinous materials. Other objects will appear hereinafter.

It has now been found that coating compositions having exceptionally desirable properties are provided by the new esters of this invention. These esters are air-drying, oily-to-resinous complex esters having a viscosity, measured in 50% solution in xylene at 25° C., of at least 0.05 poise, containing the following component radicals in the proportions specified (per cent by weight), each component being different from each of the others: (1) allyl or methallyl attached to the rest of the ester through ether oxygen, 3–25%; (2) acyclic monoacyl having eight to eighteen carbon atoms and containing at most one unsaturated linkage which, when present, is separated from the carbonyl group by at least two carbon atoms, 10–50%; (3) acyl having an ethylenic double bond adjacent to the carbonyl group, 0–20%; (4) polyacyl free of acyclic unsaturation, 3–50%; (5) the residue of a polyhydric alcohol minus the hydroxyl hydrogens, 15–40%; and (6) the residue of a hydroxyacyl minus hydroxyl hydrogen, 0–40%; the various radicals being composed of carbon, hydrogen and oxygen only (and the alcoholic and acidic radicals being present in proportions ranging from substantially chemically equivalent to a 20% excess of alcoholic radicals). The terms "residue of a polyhydric alcohol" and "hydroxyacyl residue" as used herein refer respectively to the portion of a polyhydric alcohol remaining after removal of the hydrogen atoms of the hydroxyl groups, and to the portion of a hydroxyacyl radical remaining after removal of the hydrogen atom from the hydroxyl group. By way of illustration the glycerol residue is represented by the formula

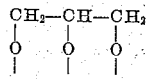

and the hydroxyacetyl residue is represented by the formula

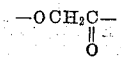

A preferred group of these esters is that in which there is at least 1% of acyl radicals having an ethylenic double bond adjacent to the carbonyl group, since such esters have especially desirable drying characteristics. The complex resinous esters of this invention are especially valuable for use in air-drying coating compositions for metal, wood and other surfaces. The resultant coatings air-dry at practical rates and the dry coatings possess an excellent combination of properties. They possess excellent durability on outdoor exposure, retaining their good flexibility for long periods of time, resisting chalking and showing low underrusting on steel surfaces. The dried coatings also possess excellent color and gloss, and they retain these characteristics on outdoor exposure.

The air-drying, oily-to-resinous esters of this invention are prepared by heating a mixture of alcoholic and carboxylic reactants which provide the radicals specified above in the proportions there given. This mixture of reactants comprises a polybasic carboxylic acid free from acyclic unsaturation; a polyhydric alcohol; an allyloxy or methallyloxy component which can be either (a) the polyhydric alcohol component partially etherified with allyl or methallyl groups so that a plurality of unetherified hydroxyl groups remain, or (b) an allyloxy- or methallyloxycarboxylic acid; and an acyclic monocarboxylic acid of from 8 to 18 carbon atoms which can contain at most one unsaturated linkage, this linkage when present being separated from the carboxyl group by at least two carbon atoms. Optionally, the reaction mixture may contain a carboxylic acid having an ethylene double bond adjacent to the carboxyl group. The above mentioned carboxylic acids and polyhydric alcohols are composed of carbon, oxygen, and hydrogen only, and the polyhydric alcohols and the carboxylic acids are present in proportions ranging from substantially chemically equivalent proportions to a 20% excess of the alcohols.

The reaction is carried out at a temperature of 125° to 250° C. in an inert atmosphere, e. g., in an atmosphere of nitrogen or of carbon dioxide, until the esterification product has an acid number of 40 or less. The time required to obtain the air-drying esters having the above-specified acid number varies from about 5 to 35 hours or more depending on the particular reactants and particular reaction temperature employed. The reaction is usually carried out at atmospheric pressure, but superatmospheric or subatmospheric pressure can be used if desired. It is preferable to carry out the heating of the reactants in two stages, the first at 180° to 210° C. to partially esterify the reactants, and the second stage at 215° to 225° C. to complete the esterification. An inert organic liquid which forms an azeotrope with the water formed as a by-product is conveniently employed as a means of facilitating the removal of the water from the reaction mixture. Xylene is a suitable carrier of this type. When a monohydric alcohol is employed as one of the reactants, it is preferable to react this alcohol with the polybasic acid free of acyclic unsaturation first, and then react the resulting ester with the remainder of the reactants.

The invention is further illustrated by the following examples in which proportions of ingredients are expressed in parts by weight unless otherwise noted.

*Example I*

A mixture of 167.5 parts of commercial dipentaerythritol (having a combining weight of 44.3), 88.8 parts of phthalic anhydride, 191.4 parts of allyloxyacetic acid, and 148.5 parts of commercial lauric acid is heated under an atmosphere of nitrogen for about 10 hours at 173° to 215° C. A small amount of xylene is added during the course of the reaction to carry off the water formed as a by-product. At the end of this reaction period the product has an acid number of 13.8 and forms a 50%, by weight, solution in xylene having a viscosity of 0.85 poise at 25° C. This ester has the following composition; allyl radical (attached to ether oxygen), 12.5%; lauroyl radical, 25.1%; alpha, beta-unsaturated acyl radical, 0%; phthaloyl radical 14.5%; dipentaerythritol residue, 30.2%; and hydroxyacyl residue, 17.7%.

Thin films of the ester of Example I containing 0.05% cobalt in the form of cobalt naphthenate as a siccative air-dry to a tack-free condition in 24 hours. The resultant coatings are pliable and tough, and possess good outdoor durability and color retention on aging.

*Example II*

A mixture of 37.1 parts of allyloxyacetic acid, 5.9 parts of phthalic anhydride, 3.9 parts of maleic anhydride, 32.0 parts of commercial dipentaerythritol, 47.5 parts of commercial lauric acid, and 10 parts of xylene to serve as a water carrier is heated under an atmosphere of nitrogen for 11 hours at 171° to 243° C. At the end of this time the reaction product has an acid number of 6.2, and the viscosity of a 50% solution of it in xylene at 25° C. is 0.85 poise. This ester contains the following proportions of different types of radicals: allyl radical (attached to ether oxygen) 11.4%; lauroyl radical, 37.8%; alpha, beta-unsaturated acyl (maleic) radical, 2.8%; phthaloyl radical, 4.6%; dipentaerythritol residue, 27.3%; and hydroxyacyl residue, 16.1%.

Films of the ester of Example II containing 0.05% cobalt as cobalt naphthenate air-dry in 30 hours to soft, very flexible coatings having good durability characteristics. Films of an ester similar to that of Example II but containing no alpha, beta-unsaturated acyl radical and with phthaloyl radicals substituted for maleyl radicals are not completely tack-free after 48 hours' drying.

*Example III*

A mixture of 7.03 parts of the tetraallyl ether of dipentaerythritol, 7.55 parts of phthalic anhydride, and 9.50 parts of coconut oil monoglyceride is heated at 135° to 185° C. for 4.5 hours and at 185° to 244° C. for 5.25 hours, using 5 parts of xylene as a water carrier. At the end of this reaction time the ester formed as an acid number of 8.3 and forms a 60%, by weight, solution in xylene having a viscosity of 1.40 poises at 25° C. This ester contains the following proportions of different types of radicals: allyl radical (attached to ether oxygen), 12.2%; coconut oil acyl, 27.5%; alpha, beta-unsaturated acyl, 0%; phthaloyl radical, 28.8%; glycerol residue, 13.3%; dipentaerythritol residue 18.2%; (total polyhydric alcohol residues, 31.5%); and hydroxyacyl residues, 0%.

Films of the ester of Example III containing 0.05% cobalt as cobalt naphthenate air-dry in about 10 hours to a tack-free condition. The resultant dry films are outstanding in outdoor durability, color retention and gloss and are considerably better in these respects than films of bodied linseed oil and of 52% linseed oil- and China-wood-oil-modified glyceryl phthalate alkyd controls.

*Example IV*

A mixture of 5.60 parts of the triallyl ether of pentaerythritol, 6.11 parts of coconut oil monoglyceride, 9.63 parts of phthalic anhydride, and 2.08 parts of glycerol is heated under nitrogen for 4 hours at 150° to 160° C. and for 6 hours at 190° to 240° C. The resulting ester has an acid number of 11.7 and forms a 52% solution in xylene having a viscosity of 5.50 poises at 25° C. The proportions of the different kinds of radicals in this ester are as follows: allyl (attached to ether oxygen), 12.2%; coconut oil acyl, 18.5%; alpha, beta-unsaturated acyl, 0%; phthaloyl, 38.8%; glycerol residue, 17.4%, and pentaerythritol residue, 13.1% (total polyhydric alcohol residues, 30.5%); and hydroxyacyl residue, 0%.

A 52% solution of the ester of Example IV in xylene containing 0.05% cobalt as cobalt naphthenate is flowed onto autobody steel panels and the composition air-dried. The resulting film is tack-free in 10 hours and possesses excellent gloss, good hardness and toughness, and has good outdoor durability and color retention.

*Example V*

A mixture of 43 parts of the diallyl ether of glycerol and 37 parts of phthalic anhydride is heated under an atmosphere of nitrogen at 150° C. until all of the phthalic anhydride is dissolved. Forty-six parts of glycerol and 50 parts of coconut oil acids (equivalent weight, 198) are then added and the resultant mixture heated at 200° C. for one hour. The reaction mixture is cooled somewhat, and 74 parts of phthalic anhydride is added. This mixture is then heated 10 hours at 200° to 230° C. At the end of this time the reaction product has an acid number of 29.9 and forms a 50% solution in xylene having a viscosity of 0.50 poise at 25° C. The ester of this example has the following composition; allyl radical (attached to ether oxygen), 8.9; coconut oil acyl radical, 19.7%; alpha, beta-unsaturated acyl radical, 0%; phthaloyl radical, 42.6%; glycerol residue, 28.8%; and hydroxyacyl residue, 0%.

Thin films of this composition flowed onto sanded autobody steel panels air-dry in 15–20 hours to a tack-free condition. The resultant coatings possess good color and flexibility. On outdoor exposure, the sanded autobody steel panels coated with this ester show outstanding durability and give much better protection of the metal towards underrusting than control panels coated with finishes based on natural drying oils.

*Example VI*

A mixture of 300 parts of coconut oil, 65 parts of glycerol, and 0.3 part of litharge is heated one hour at 230° to 235° C. To the resultant product is added 1005 parts of phthalic anhydride, 756 parts of the alpha-monoallyl ether of glycerol and 110 parts of xylene. This mixture is then heated 15.5 hours at 180° to 210° C. At the end of this time the reaction product has an acid number of 20.6 and forms a 58.4% solution in xylene having a viscosity of 6.3 poises at 25° C. The composition of this ester is as follows: allyl radical (attached to ether oxygen), 11.7%; coconut oil acyl radical, 12.9%; alpha,beta-unsaturated acyl radical, 0%; phthaloyl radical, 44.7%; glycerol residue, 30.7%; and hydroxyacyl residue, 0%.

Thin films of the ester of Example VI containing 0.05% cobalt as cobalt naphthenate flowed onto autobody steel panels air-dry to a tack-free condition in about 4 hours. The resultant coatings possess a very good balance of properties, being hard, flexible, colorless, and inert.

The importance of the presence of both allyl or methallyl ether groups attached to ether oxygen and acyclic monoacyl radicals of 8 to 18 carbon atoms in producing the improved esters of this invention is shown by the following experiment in which an ester similar to that of Example VI is prepared, but with the single exception that the acyclic monoacyl radical is omitted. A mixture of 132 parts of the alpha-monoallyl ether of glycerol and 148 parts of phthalic anhydride are heated for 35 hours at 180° to 210° C. At the end of this time the reaction product possesses a viscosity of 2.5 poises in a 52.8% solution in xylene at 25° C. and has an acid number of 19.8. This ester contains the following proportions of different radicals: allyl (attached to ether oxygen), 15.7%; phthaloyl, 50.3%, and glycerol residues, 34.0%. This composition in the presence of 0.05% cobalt, as cobalt naphthenate, air-dries to a tack-free film in about 7 hours. However, within a few weeks the coating of this composition becomes quite brittle. On the other hand the composition of Example VI, which also contains the allyl radical joined to the rest of the ester through ether oxygen, but in addition contains the coconut oil acyl radical, retains its original good flexibility for long periods of time.

*Example VII*

A mixture of 27.5 parts of coconut oil monoglyceride, 14.8 parts of phthalic anhydride, 9.8 parts of maleic anhydride, 13.2 parts of glycerol monoallyl ether, 0.1 part of p-toluene-sulfonic acid and about 10 parts of xylene to serve as a water carrier is heated 26 hours at 135–145° C.

The final product has an acid number of 29.0 and a viscosity of 0.6 poise at 46.2% solids in xylene at 25° C. This ester contains the following proportions of different types of radicals: allyl (attached to ether oxygen), 6.6%; lauroyl radical, 29.9%; alpha,beta-unsaturated acyl (maleic) radical, 13.2%; phthaloyl radical 21.4%; glycerol residue, 28.9%; and hydroxy acyl residue, 0%.

Films of this ester containing 0.05% cobalt as cobalt naphthenate air-dry within 24 hours to relatively hard, flexible coatings having very good color and outdoor durability characteristics.

*Example VIII*

A mixture of 159 parts of beta-allyloxyethanol and 933 parts of phthalic anhydride is heated for 30 minutes at 140° C. To the resulting product is added a mixture of 875 parts of coconut oil monoglyceride, 149 parts of glycerol, and 110 parts of xylene, and the mixture is then heated at reflux temperature (200–220° C.) for 12 to 14 hours. At the end of this time, the reaction product has an acid number of 22.2, a specific gravity of 1.000 and forms a 50% solution in xylene having a viscosity of 8.2 poises at 25° C. This ester contains 3.2% allyl radical, 29.2% lauroyl (coconut oil acyl) radical, 0.0% alpha,beta-unsaturated acyl radical, 41.7% phthaloyl radical, 21.2% glycerol residue and 4.7% ethylene glycol residue (total polyhydric alcohol residues, 25.9%), and 0.0% hydroxyacyl residue.

A xylene solution of the ester of Example VIII containing 0.05% cobalt as cobalt linoleate flowed onto steel panels, air dries to a tack-free condition in 24–36 hours at room temperature. The resulting coatings are flexible, and they have good gloss. Similar coatings are obtained by baking the coated steel panels at about 108° C. for ½ hour.

*Example IX*

A mixture of 478 parts of stearic acid and 174 parts of glycerol is heated at reflux temperature for one hour. A mixture of 569 parts of glycerol monoallyl ether, 924 parts of phthalic anhydride, and 110 parts of xylene is then added and the reaction mixture heated at reflux temperature (200–220° C.) for three 8-hour periods on three successive days. The resulting product has an acid number of 16.2, a specific gravity of 1.034, and forms a 60% solution in xylene having a viscosity of 10.5 poises. This ester contains 8.9% allyl radical, 22.4% stearoyl radical, 0% alpha,beta-unsaturated acyl, 41.2% phthaloyl radical, 27.4% glycerol residue, and 0% hydroxyacyl residue.

A xylene solution of the ester of Example IX containing about 0.05% cobalt as cobalt linoleate flowed onto steel panels dries tack-free in 12 hours at room temperature and in ½ hour at 108° C. The resulting coatings are flexible and have good gloss.

*Example X*

A mixture of 25 parts of a partial methallyl ether of commercial pentaerythritol having an iodine number of 231.5, 25 parts of coconut oil monoglyceride, 7.3 parts of glycerol, 35 parts of phthalic anhydride, and 10 parts of xylene is heated under nitrogen for 6.5 hours at 175°–185° C. and for 8 hours at 185°–207° C. The water formed during the reaction is distilled off as a water-xylene binary. The resultant polyester has an acid number of 17.5 and forms a 48.5% solution in xylene having a viscosity of 0.32 poise at 25° C. This ester contains the following proportions of different radicals: methallyl (attached to ether oxygen) 14.2%; coconut oil acyl, 18.8%; phthaloyl, 35.4%; and glycerol residues, 17.2%; pentaerythritol residues, 14.4% (total polyhydric alcohol residues, 31.6%).

Films of the ester of Example X containing 0.1% cobalt as cobalt linoleate coated on bare steel air-dry to a tack-free film in about 10 hours. These films also set up well on baking for 20 minutes at 110° C. The resultant dry coatings possess excellent flexibility, good gloss and good resistance to xylene and other chemicals.

The resinous, complex esters of this invention include others having the particular kinds and proportions of radicals specified above besides those specifically mentioned in the examples. The essential group of allyl or methallyl joined through ether oxygen to the remainder of the ester can be attached to either the hydroxyacyl residue or the polyhydric alcohol residue in the final ester. These essential allyl ether and methallyl ether radicals are conveniently provided by such reactants as allyloxyacetic acid, methallyloxyacetic acid, α-allyloxypropionic acid, α-allyloxybutyric acid, β-allyloxyethanol, glycerol α-methallyl ether, glycerol diallyl ether, pentaerythritol triallyl ether, allyl glycidyl ether, and the like.

The coconut oil acyl radicals of the examples can also be replaced by other acylic monoacyl radicals having 8 to 18 carbon atoms and containing at most one unsaturated linkage which, when present, is separated from the carbonyl group by at least two carbon atoms, within the proportions of from 10 to 40% of the weight of the ester. More specifically, the lauroyl radical of the examples can be replaced by, for example, the acyl radicals of stearic, myristic, caprylic and oleic acids.

Likewise, the esters of this invention can contain from 0 to 20% by weight of acyl radicals having an ethylenic double bond adjacent to the carbonyl group, other than the maleic acid radical illustrated in some of the examples. Specific examples of other suitable radicals of this type include the acyl radicals of acrylic, itaconic and fumaric acids.

Furthermore, other polyacyl radicals free of acyclic unsaturation in addition to the phthaloyl radicals in the examples can be used as this type of component radical in the esters of this invention. Specific examples of suitable radicals of this type include the acyl radicals of sebacic, adipic, tricarballylic, and the like, acids.

Also, besides the glycerol, pentaerythritol, and dipentaerythritol residues of the examples, other polyhydric alcohol residues in proportions of from 15% to 40% by weight can be included in the esters of this invention. Specific polyhydric alcohol residues of this type include the residues, i. e., the alcohol minus the hydroxyl hydrogens, of the following alcohols: ethylene glycol, sorbitol, mannitol, erythritol, and the like.

Finally, in addition to the hydroxyacetyl residue of Examples I and II, hydroxyacyl residues, i. e., the hydroxyacyl radical minus the hydroxyl hydrogen, of other hydroxycarboxylic acids can be present. For example, residues of this type derived from α-hydroxypropionic and α-hydroxybutyric acids are also operable. When hydroxyacyl residues are present in the esters of this invention, the hydroxyl oxygen is joined to allyl or methallyl groups.

The properties of the products of this invention are determined to a considerable degree by the proportions of the different types of radicals making up the complex esters. For example, esters containing higher proportions of the acyclic monoacyl of 8 to 18 carbon atoms, such as 30–40%, are softer and more flexible than those containing 10–30% of this type of radical. As indicated previously, the presence of the acyl radical having an ethylenic double bond adjacent to the carbonyl group imparts a faster drying rate to the composition and for this reason esters containing at least 1.0% of this type of radical are preferred for fast drying finishes. Although the products of this invention consist of compositions as defined above, very small amounts of usual alkyl resin modifiers such as rosin or stearyl alcohol which do not grossly alter properties may be included.

In addition to cobalt naphthenate and cobalt linoleate, other conventional siccatives can be used in the air-drying compositions of this invention. Examples of such siccatives include metal salts, e. g., cobalt, lead, and manganese salts of unsaturated acids such as linoleic and naphthenic acids. Cobalt linoleate causes faster drying than cobalt naphthenate and for this reason is a preferred siccative, especially in compositions containing materials such as toluidine red, carbon black, and phenolic resins, which tend to retard the rate of drying of these coating compositions.

The complex resinous esters of this invention can be mixed with conventional ingredients of coating compositions, e. g., plasticizers, pigments, dyes, fillers, etc. The esters of this invention can also be blended with other types of coating compositions. By way of illustration, they can be blended with (a) natural drying oils, e. g., linseed and chinawood oils; (b) natural drying oil-modified alkyd resins, e. g., 62% linseed oil-modified glyceryl phthalate; (c) polymerizable vinyl monomers, e. g., lauryl methacrylate and tetraethylene glycol dimethacrylate; and, (d) urea-formaldehyde resins, e. g., a butanol-modified urea-formaldehyde resin.

Although emphasis has been placed in the examples and in other places on the air-drying characteristics of the esters of this invention, they can also be heated at elevated temperatures for various lengths of time to obtain the desired coatings. The particular times and temperatures of heating required to produce these coatings are interrelated and are also dependent on other factors such as the composition of the ester and the type and concentration of siccative being used. In general, temperatures up to 125° C. or more, and times ranging from a few minutes, e. g., 10–20 minutes, up to several hours can be used, and usually the higher temperatures require the shorter times.

The new esters described herein are particularly valuable as ingredients of coating compositions because of the unusual combination of properties which they possess. The compositions form tough, durable coatings which retain their flexibility over long periods of exposure to the weather. They also possess better color and color retention than the conventional drying oil acid-modified alkyd resins. The esters possess good air-drying characteristics, and those containing at least 1.0% of alpha-beta-unsaturated acyl groups are especially suitable from this standpoint.

As many apparently widely different embodiments of this invention may be made without departing from the spirit and scope thereof, it is to be understood that I do not limit myself to the specific embodiments thereof except as defined in the appended claims.

I claim:

1. An air-drying oily-to-resinous ester which has a viscosity, measured in 50% solution in xylene at 25° C., of at least 0.05 poise, and in which the component radicals in per cent by weight comprise from 3% to 25% of radicals which are selected from the group consisting of allyl and methallyl and which are attached to the remainder of the ester through ether oxygen, from 10% to 50% acyclic monoacyl having from eight to eighteen carbon atoms and containing at most one unsaturated linkage which, when present, is separated from the carbonyl group by at least two carbon atoms, up to 20% acyl having an ethylenic double bond adjacent to the carbonyl group, from 3% to 50% polyacyl free from acyclic unsaturation, from 15% to 40% of the residue of a polyhydric alcohol resulting from the elimination of the hydroxyl hydrogens therefrom, and up to 40% of the residue of a hydroxyacyl resulting from the elimination of hydroxyl hydrogen therefrom, each of said component radicals being different from each of the others and being composed of carbon, hydrogen and oxygen only, said component radicals which are alcoholic and said acidic radicals being present in proportions ranging from substantially chemically equivalent to a 20% excess of the alcoholic radicals.

2. An air-drying oily-to-resinous ester as set forth in claim 1 wherein said acyl radical having an ethylenic double bond adjacent to the carbonyl group amounts to 1% to 20% by weight.

3. An air-drying oily-to-resinous ester as set forth in claim 1 wherein said acyclic monoacyl radical amounts to 30% to 40% by weight.

4. An air-drying oily-to-resinous ester as set forth in claim 1 wherein said acyclic monoacyl radical is the lauroyl radical.

5. An air-drying oily-to-resinous ester as set forth in claim 1 wherein said polyacyl radical free from acyclic unsaturation is the phthaloyl radical.

6. An air-drying oily-to-resinous ester as set forth in claim 1 wherein said residue of a polyhydric alcohol is the residue of dipentaerythritol.

7. An air-drying oily-to-resinous ester as set forth in claim 1 wherein said residue of a polyhydric alcohol is the residue of pentaerythritol.

8. An air-drying oily-to-resinous ester as set forth in claim 1 wherein said residue of a polyhydric alcohol is the residue of glycerol.

9. An air-drying oily-to-resinous ester which has a viscosity, measured in 50% solution in xylene at 25° C., of at least 0.05 poise, and in which the component radicals in per cent by weight comprise from 3% to 25% of radicals which are selected from the group consisting of allyl and methallyl and which are attached to the remainder of the ester through ether oxygen, from 30% to 40% lauroyl, from 1% to 20% acyl having an ethylenic double bond adjacent to the carbonyl group, from 3% to 50% phthaloyl, from 15% to 40% of the residue of dipentaerythritol resulting from the elimination of hydroxyl hydrogen therefrom, and up to 40% of the residue of an hydroxyacyl resulting from the elimination of hydroxyl hydrogen therefrom, each of said component radicals being different from each of the others and being composed of carbon, hydrogen and oxygen only, said component radicals which are alcoholic and said acidic radicals being present in proportions ranging from substantially chemically equivalent to a 20% excess of the alcoholic radicals.

FRED W. HOOVER.

REFERENCES CITED

The following references are of record in the file of this patent:

UNITED STATES PATENTS

| Number | Name | Date |
|---|---|---|
| 1,893,611 | Bradley | Jan. 10, 1933 |
| 1,893,873 | Kienle | Jan. 10, 1933 |
| 2,399,214 | Evans et al. | Apr. 30, 1946 |

FOREIGN PATENTS

| Number | Country | Date |
|---|---|---|
| 867,718 | France | Nov. 25, 1941 |